April 26, 1960     G. T. MORSE     2,934,399

CASE MOLDS

Filed April 25, 1956

INVENTOR.
GEORGE T. MORSE
BY
*Francis J. Sarkoff*
ATTORNEY

United States Patent Office 2,934,399
Patented Apr. 26, 1960

2,934,399
CASE MOLDS
George T. Morse, Metuchen, N.J.
Application April 25, 1956, Serial No. 580,635
3 Claims. (Cl. 18—47)

The present invention relates to ceramics and more particularly to case molds and their production.

In the casting process of duplicating objects of ceramic materials, a plaster of Paris working mold, made in sections, is filled with slip. As the mold absorbs the water in the slip a film of ceramic material is deposited on the sides of the mold. The mold is then carefully stripped off.

Since time is required for the working mold to absorb the water from the slip and then be dried in turn, mass production of duplicated objects requires the production of a large number of working molds.

Heretofore, these working molds are made in duplicate by heavily coating the master positive or case mold with a soap sizing for each working mold made over it. The case mold is generally made almost entirely from gypsum plaster or cement. Such case molds suffer due to the setting expansion of the gypsum plaster cast over it. This shortens the life of the case mold, particularly when the case mold carries sharp edges, fine detail and little draft.

A primary object of this invention is to provide for improved casting of ceramic objects.

Another object of this invention is to provide an improved case mold for the production of working molds.

Still another object of this invention is to provide a durable case mold which will not deform or distort.

Still another object of this invention is to provide an improved case mold requiring little or no soap sizing.

According to the present invention there is provided a built-up thermal-setting formulated resin master positive or case mold with a backing of low expansion gypsum cement or a dimensionally stable resin—aggregate cement which will hold the resin formulated face rigid without distortion or warpage. The case mold may have a flock to secure a good bond between the mold and its backing.

Other and incidental objects of this invention will become apparent after a reading of the following specification when considered with the accompanying drawing wherein.

Throughout the various figures of the drawing, the same numeral will be employed to designate the same element.

Figure 1:
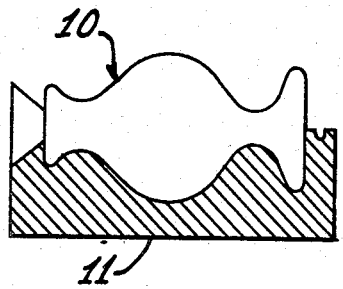
Figure 1 illustrates in section a master negative or block mold.

Turning now in detail to Figure 1 there is shown at 10 an object to be duplicated or a ceramic mold thereof. A section or one half of the master negative or block mold is shown at 11. The master negative or block mold 11 must be duplicated to form a number of working molds when a number of copies of the object are required. This is necessary since the working mold is the mold into which the ceramic composition or "slip" is poured. The porous working mold absorbs water from the "slip" forming a leather-hard coating of clay around the interior of the mold to form the shape of the original object.

In making the master negative or block mold 11 the object 10 is coated with a soft soap solution which is allowed to dry. The object to be duplicated is then properly boxed. Plaster-of-Paris is then formed about the master 10 with a divider to form sections of the master negative mold 11. In the drawing a single section is shown for the purpose of explanation.

Figure 2:
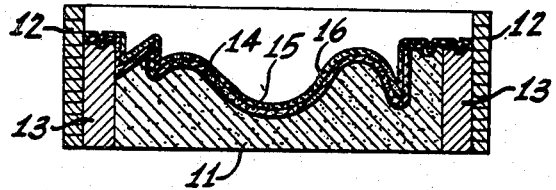
Figure 2 shows the built-up section of the case mold in the master negative or block mold.
Figure 3:
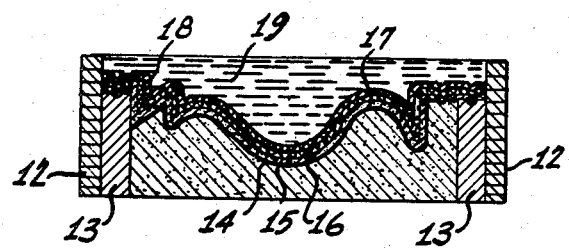
Figure 3 illustrates the case mold after the case mold backing has been applied.

Figure 2 shows the master negative mold 11 removed from the object or master mold 10. Sides 13 with key ways are set up at the ends of the master negative mold 11. Dams 12 are then fastened against the sides 13. The sides 13 may be made from pre-set gypsum slabs.

The inside of the master negative mold 11 is then coated with a soft soap solution 14, as is commonly used on molds in the ceramics industry. The soap solution 14 is allowed to dry. A thin vapor barrier coating 15 such as polyvinyl chloride is next brushed or sprayed on the active surface of the master negative mold 11. After the vapor barrier coating 15 has dried, a separator 16 such as a coat of polyvinyl alcohol is brushed or sprayed on the vapor barrier coating 15 and allowed to dry. Silicon oil or grease or some stearates in solution may be used as the separator 16.

Next, an epoxy or similar thermo-setting resin 17 containing some flock 18 is prepared with the proper amount of curative hardening agent and applied to the entire surface with a brush. Flock 18 may for example be chopped fiber glass. Care must be taken to eliminate all air bubbles. When this coat has hardened a light brush bond coat is applied and this is followed immediately by the finish or build-up coat to obtain the desired thickness of the resin form which may be 1/8" to 1/4" thick. The build-up coat is prepared by adding about 20% of short fiber such as 1/2" chopped fiber glass or other fibrous strands to the epoxy or similar thermo-setting resin to which has been added the proper amount of curing agent.

The mixture is tamped well into all angular spots and well into the thin bond coat. As the desired thickness is obtained the fiber or strands 18 are allowed to stand at angles to the surface, this being the key or bond to the gypsum cement or other cementitious backing 19.

After the built-up coat has hardened a slurry of low-expanding gypsum cement 19 is poured into the form and allowed to set.

In one form of the invention a coating of thermo setting resin without the flock is first applied to the separator 16 in order to insure a smooth working surface.

In one form of the invention fibers, generally of the type used in the flock 18 may be sprinkled on or otherwise applied to the surface of the epoxy 17 before the epoxy cures in such a manner that the fibers extend into the epoxy 17 when it has set and also extend from the epoxy 17.

Figure 4:
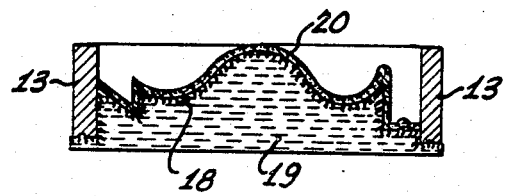
Figure 4 shows the case mold in position to enable the production of working molds.

Figure 4 shows the completed case mold in position to pour a section of the working mold. Sides 13 are in place. The surface 20 is impervious to moisture, glassy and needs little or no separating compound to release the poured plaster working mold.

As an alternate to the short glass fiber used as flock 18, woven glass cloth or other continuous weave material may be used as reinforcing, where irregular surfaces or corners are not encountered. This will eliminate much of the mixing of resin and short fiber. The glass cloth can be laid on the resin surface and successive coats of resin and cloth laid on in alternate coats to the desired thickness. The final coat may be the chopped fiber resin mix laid on at random to form the key to the cementitious backing.

In still another form of the invention the outlined procedure through brushing on the prime lay-up coat is followed and then instead of using the resin-fiber coatings, there is employed a cementitious backing composed of thermo setting resin with the proper proportion of curing agent. To this is added a sized aggregate filler of a metallic or non-metallic nature. Such aggregate is added to the resin cure mix to the extent that the cement formed maintains sufficient fluidity to conform to the contour of the prime lay-up coat.

Low priced aggregates such as ground lime stone, trap rock, silicate sand feldspars and the like may be used. As an example sand, number 20-30 can be added to the resin-mix in a ratio of 4 pounds of sand to 1 pound of the resin-cured mix.

A case mold made in accordance with the teachings of this invention will have no setting expansion, and therefore will not deform or distort. The case mold will have high tensile strength and compressive strength and therefore will not be affected by the expansion of the setting gypsum plaster formed over it.

The case mold will be highly impervious, and will have a glass like surface and therefore will require little or no soap sizing, thereby eliminating a costly operation and one which causes build-up on the surface of the case mold to destroy its relief and usefulness.

It will be easily cleaned as its impervious surface will also stand washing without eroding fine detail.

I claim:

1. The method of forming a case mold comprising the steps of making a master negative mold from an object to be duplicated, coating the active surface of the master negative mold with a soft soap solution to dry, applying a vapor barrier coating over the dried soft soap solution, applying a separator layer to said vapor barrier coating, applying a mixture of resin and flock to said separator layer, adding flock to the surface of said mixture layer before said mixture has set to form a build up, and backing the build-up with a cement composition.

2. The method of forming a case mold comprising the steps of making a master negative mold from an object to be duplicated, coating the surface of the master negative mold with a soft soap solution, allowing the soft soap solution to dry, applying a vapor barrier coating over the soft soap solution, applying a separator layer to said vapor barrier coating, applying a resin to said separator layer, applying a mixture of resin and flock to said resin, adding flock to the surface of said mixture layer before said mixture has set, and applying a cement composition to the flock.

3. The method of forming a case mold comprising the steps of making a master negative mold from an object to be duplicated, coating the active surface of the master negative mold with a sealer, applying a vapor barrier over the sealer, applying a separator to said vapor barrier, applying a thermo-setting resin to said vapor barrier, applying a flock to said thermo-setting resin and backing the resin and flock with a low expanding cementitious compound.

References Cited in the file of this patent

UNITED STATES PATENTS

| | | |
|---|---|---|
| 896,914 | Hough | Aug. 25, 1908 |
| 1,558,440 | Weber | Oct. 20, 1925 |
| 1,577,357 | Peano | Mar. 16, 1926 |
| 2,189,154 | Stewart | Feb. 6, 1940 |
| 2,271,454 | Erdle et al. | Jan. 27, 1942 |
| 2,363,213 | Wallace | Nov. 21, 1944 |
| 2,441,548 | Sperry | May 11, 1948 |
| 2,599,573 | Milton et al. | June 10, 1952 |
| 2,714,559 | Sheffield et al. | Aug. 2, 1955 |
| 2,846,742 | Wagner | Aug. 12, 1958 |